United States Patent [19]
Naqvi

[11] Patent Number: 5,848,199
[45] Date of Patent: Dec. 8, 1998

[54] APPARATUS AND METHOD FOR PERFORMING FAST AND PRECISE SPATIAL TRANSFORMATIONS OF IMAGES

[75] Inventor: H. Shahzad Naqvi, Fort Collins, Colo.

[73] Assignee: Hewlett Packard Company, Palo Alto, Calif.

[21] Appl. No.: 656,130

[22] Filed: May 31, 1996

[51] Int. Cl.$^6$ .............................. G06K 9/32; G06K 9/36
[52] U.S. Cl. .................. 382/276; 382/277; 382/285; 382/293; 358/448
[58] Field of Search ................................ 382/276, 277, 382/293, 285, 295; 358/448

[56] References Cited

U.S. PATENT DOCUMENTS

| | | | |
|---|---|---|---|
| 4,775,973 | 10/1988 | Tomberlin et al. | |
| 4,975,976 | 12/1990 | Kimata et al. | 382/293 |
| 5,204,944 | 4/1993 | Wolberg et al. | 382/277 |
| 5,644,758 | 7/1997 | Patrick et al. | 395/525 |
| 5,664,082 | 9/1997 | Chen et al. | 345/436 |

*Primary Examiner*—Leo H. Boudreau
*Assistant Examiner*—Daniel G. Mariam

[57] ABSTRACT

An apparatus and a method for performing spatial transformations of digital images with reduced computation time are provided. In one embodiment of the present invention, an image processing apparatus for transforming a source image into a destination image generates a transformation matrix having transformation variables represented in fixed point format, maps a first pixel of a destination pixel array onto a source pixel array by multiplying the row value and the column value of the first pixel by the transformation matrix to obtain a first mapped position on the source pixel matrix, maps a second pixel of the destination array onto the source array by adding a first variable of the transformation to an x value of the first mapped position and by adding a second variable of the transformation matrix to the y value of the first mapped position to obtain a second mapped position. Embodiments of the present invention determine a value of each one of the pixels of the destination pixel array based on a value of at least one of the pixels of the source pixel array and based on a mapped position of the one of the pixels of the destination array.

20 Claims, 4 Drawing Sheets

APPARATUS AND METHOD FOR PERFORMING FAST AND PRECISE SPATIAL TRANSFORMATIONS OF IMAGES

FIELD OF THE INVENTION

The present invention relates generally to digital image processing, and more particularly to a method and apparatus for performing fast and precise image spatial transformations.

DISCUSSION OF THE RELATED ART

There is a growing need for users of computers and workstations for viewing and processing images representative of objects. Images from a variety of different applications are being digitized and displayed on conventional computer systems. Applications in which image processing is used include digital x-ray, magnetic resonance imaging (MRI), digital film, digital video, and images produced by remote sensors such as satellite images. In these image processing applications, there is typically a need to provide enhancement of the images. Enhanced computer systems of the prior art provide a user with the ability to zoom, pan and rotate an image displayed by, or stored within, the computer system.

Figure 1:
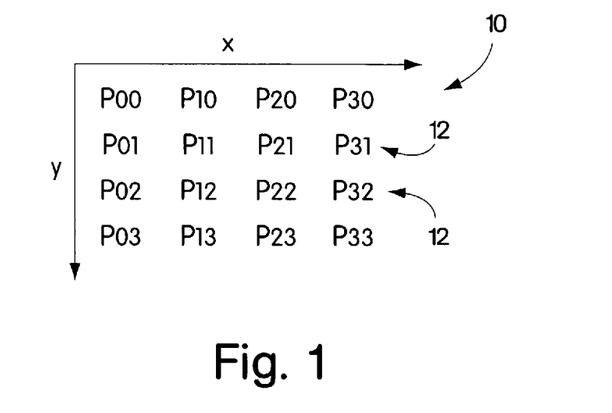
FIG. 1 is a diagram showing a 4×4 pixel array.

Images displayed on computer systems are typically represented as an array of pixels. FIG. 1 shows a 4×4 pixel array 10 that may be used to represent an image. The image is defined based on a value of each of the pixels 12 of the array. In typical applications, each of the pixels is identified by a row number and a column number or by an x value and a y value as shown in FIG. 1. For example, pixel $p_{21}$ is in the third column and the second row of the pixel array 10, and accordingly has an "x" value of 2 and a "y" value of 1.

The actual number of pixels comprising a pixel array is selected based on the size of an image to be displayed and based on a desired resolution of the image. In typical computer systems, each of the pixels of a pixel array has at least one intensity value represented by a digital word comprised of a predetermined number of bits. The number of bits used to represent the value of each pixel is a function of the desired resolution of images to be represented by the pixel array. In many applications of the prior art, the pixel value of each pixel of an array used to generate black and white images is represented by an 8-bit digital word. The use of an 8-bit word provides 256 shades of gray for each of the pixels. In many medical image applications, black and white images are represented by 12-bit words, and in typical color applications, each pixel has three values, corresponding to red, green and blue, with each of the values being represented by an 8-bit word.

In prior art image processing systems, the transformation of images to accomplish the pan, zoom, and rotate functions discussed above is achieved using either hardware, software, or a combination of hardware and software. The transformation of an image to pan, zoom, or rotate the image requires a mapping of pixels from a first array (defined as the source array) to a second array (defined as the destination array). One of two mapping approaches is typically used in prior art systems: forward mapping in which the pixels of the source array are transformed and "fit" into the destination array, and backward mapping in which each pixel of the destination array is transformed and resampled from the pixels of the source array.

Figure 2:
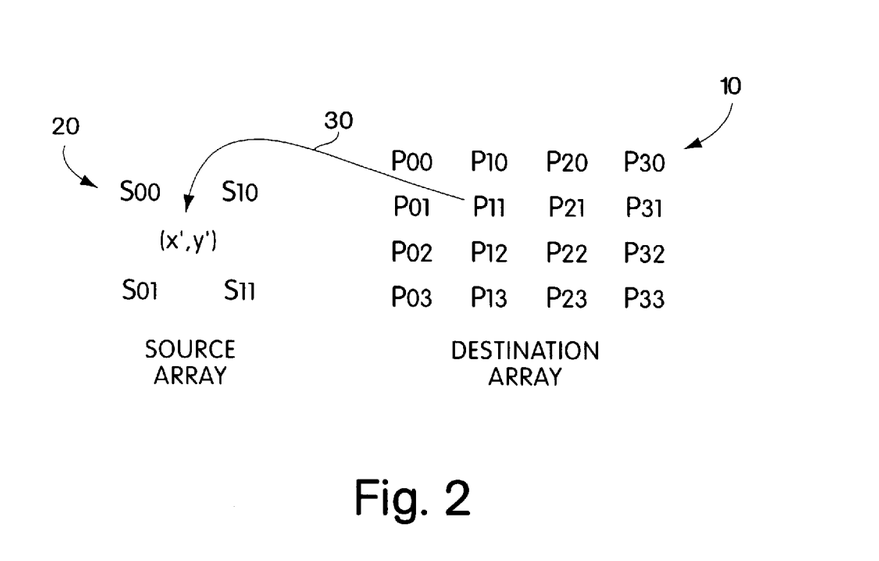
FIG. 2 is a diagram showing the backward mapping of a destination pixel array onto a source pixel array.

When performing either a pan function or an orthogonal rotate function of an image, in which the size of the image is not changed, there is a one-to-one mapping between each pixel (x', y') of the source array and each pixel (x, y) of the destination array. However, when performing a zoom function in which the size (i.e. the number of pixels) of the destination array is either greater than or less than the size of the source array, there is no longer a one-to-one mapping between each pixel of the source array and the destination array. In order to accomplish backward mapping, a resampling of the source array must be performed to generate the pixel values of the destination array. FIG. 2 shows the 4×4 array 10 of FIG. 1 as a destination pixel array that is backward mapped into a 2×2 source array 20. Each pixel of the destination array is designated as $p_{xy}$, and each pixel of the source array is designated as $s_{xy}$ where x and y respectively represent a column number and a row number of each array. As shown by arrow 30 in FIG. 2, pixel $P_{11}$ of the destination array is backward mapped to a position (x', y') in the source array that lies between the four pixels of the source array.

After each pixel of the destination array is mapped onto the source array, one of three methods is used to determine the value of the destination pixel; nearest neighbor sampling, bilinear interpolation, or bicubic interpolation. The calculated mapped position (x', y') on the source array of a destination pixel at location (x, y) in the destination array is typically a non-integer value as shown in FIG. 2. However, the pixels of the source array occur only at integer values. Thus, in order to determine the value of the destination pixels, it is necessary to perform a sampling using values of pixels of the source array near the mapped position. In nearest neighbor sampling, the value of the pixel (x, y) of the destination array is set equal to the value of the pixel of the source array located at the position determined by the scalar portion of x' and y'. In the example shown in FIG. 2, the value of pixel $p_{11}$ would equal the value of pixel $s_{00}$, using nearest neighbor sampling.

In bilinear interpolation, the value of each pixel (x, y) of the destination array is calculated based on the values of the four pixels of the source array nearest the mapped position (x', y'). In bicubic interpolation, the value of each pixel (x, y) of the destination array is calculated based on the values of the sixteen pixels of the source array nearest the mapped position (x', y').

The following procedure is used to map each pixel (x, y) of the destination array on to the source array. First, an initial pixel ($p_{00}$) of the destination array is represented in matrix notation, as shown in equation (1) below, having a single column and three rows; the first and second rows respectively include the x and y values of the pixel, and the third row is a place holder and is always equal to 1 for affine or non-perspective transformations.

Second, the mapped position (x', y') on the source array of the pixel $p_{00}$ of the destination array is calculated by multiplying the destination pixel array by a 2-D affine transformation matrix as shown in equation (1) below.

$$\begin{bmatrix} a & d & g \\ b & e & h \\ 0 & 0 & 1 \end{bmatrix} * \begin{bmatrix} x \\ y \\ 1 \end{bmatrix} = \begin{bmatrix} x' \\ y' \\ 1 \end{bmatrix} \quad (1)$$

In the 2-D affine transformation matrix, the variables a and e determine the scale between the destination array and the source array, and thus are used to provide the zoom function, variables a, b, d, and e determine the degree of rotation of the destination pixel array with respect to the source array, and variables g and h determine the translation of the destination array with respect to the source array and are used to provide the pan function. The combination of the variables in the 2-D affine transformation matrix is used to provide a transformed image that is of a different scale, rotated and translated from an original image. The variables of the transformation matrix are typically floating point values.

Equations (2) and (3) shown below are derived from equation (1) and are used to calculate x' and y' of equation (1).

$$x'=(a*x)+(d*y)+g \quad (2)$$

$$y'=(b*x)+(e*y)+h \quad (3)$$

The values of x' and y' are represented using floating point values and indicate the location in the source array to which the pixel $p_{00}$ of the destination array is mapped using backward mapping. Each of the pixels of the destination array is mapped to the source array, and the value of each pixel of the destination array can then be determined using one of the three methods described above.

The prior art procedure for performing spatial image transformations described above may be used to provide precise output transformed images for an input image. However, the procedure requires the multiplication of several floating point variables in order to determine the values of the pixels of the destination array. Computer systems used for displaying and processing spatial images require relatively long periods of time to perform floating point multiplications, and a user of the computer system may be required to wait an undesirable amount of time for the transformation of an image to be completed.

SUMMARY OF THE INVENTION

In embodiments of the present invention, an apparatus and a method is provided to reduce the processing time of computer systems performing spatial image transformations.

In one embodiment of the present invention, an image processing apparatus transforms a source image representative of an object into a destination image representative of the object, said source image comprising a source pixel array and said destination image comprising a destination pixel array. The source pixel array and the destination pixel array each have a plurality of pixels, and each of the plurality of pixels has an x value and a y value. The image processing apparatus includes means for generating a transformation matrix having transformation variables represented in fixed point format, means for mapping a first pixel of the destination pixel array onto the source pixel array by multiplying the x value and the y value of the first pixel by the transformation matrix to obtain a first mapped position on the source pixel array, means for mapping a second pixel of the destination array onto the source array by adding a first variable of the transformation matrix to the x value of the first mapped position and by adding a second variable of the transformation matrix to the y value of the first mapped position to obtain a second mapped position.

In another embodiment, the image processing apparatus further includes means for mapping a first pixel of a second row of the destination pixel array to the source pixel array by multiplying the x value and the y value of the first pixel of the second row by the transformation matrix to obtain a third mapped position on the source pixel array, and means for mapping a second pixel of the second row of the destination array onto the source array by adding the first variable of the transformation matrix to the x value of the third mapped position and by adding the second variable of the transformation matrix to the y value of the third mapped position.

In yet another embodiment, the image processing apparatus of the first embodiment further includes means for mapping a first pixel of a second row of the destination array to the source array by adding a third variable of the transformation matrix to the x value of the first mapped position and by adding a fourth variable of the transformation matrix to the y value of the first mapped position to obtain a third mapped position on the source array, and means for mapping a second pixel of the second row of the destination array onto the source array by adding the first variable of the transformation matrix to the x value of the third mapped position and by adding the second variable of the transformation matrix to the y value of the third mapped position.

Another embodiment of the present invention is directed to a method for transforming a source image representative of an object into a destination image representative of the object, said source image comprising a source pixel array and said destination image comprising a destination pixel array. The method includes steps of generating a transformation matrix having transformation variables represented in fixed point format, mapping a first pixel of the destination array onto the source array by multiplying the x value and the y value of the first pixel by the transformation matrix to obtain a first mapped position, and mapping a second pixel of the destination array onto the source array by adding a first variable of the transformation matrix to the x value of the first mapped position and by adding a second variable of the transformation matrix to the y value of the first mapped position to obtain a second mapped position.

BRIEF DESCRIPTION OF THE DRAWINGS

For a better understanding of the present invention, reference is made to the accompanying drawings which are incorporated herein by reference and in which.

DETAILED DESCRIPTION

Figure 3:
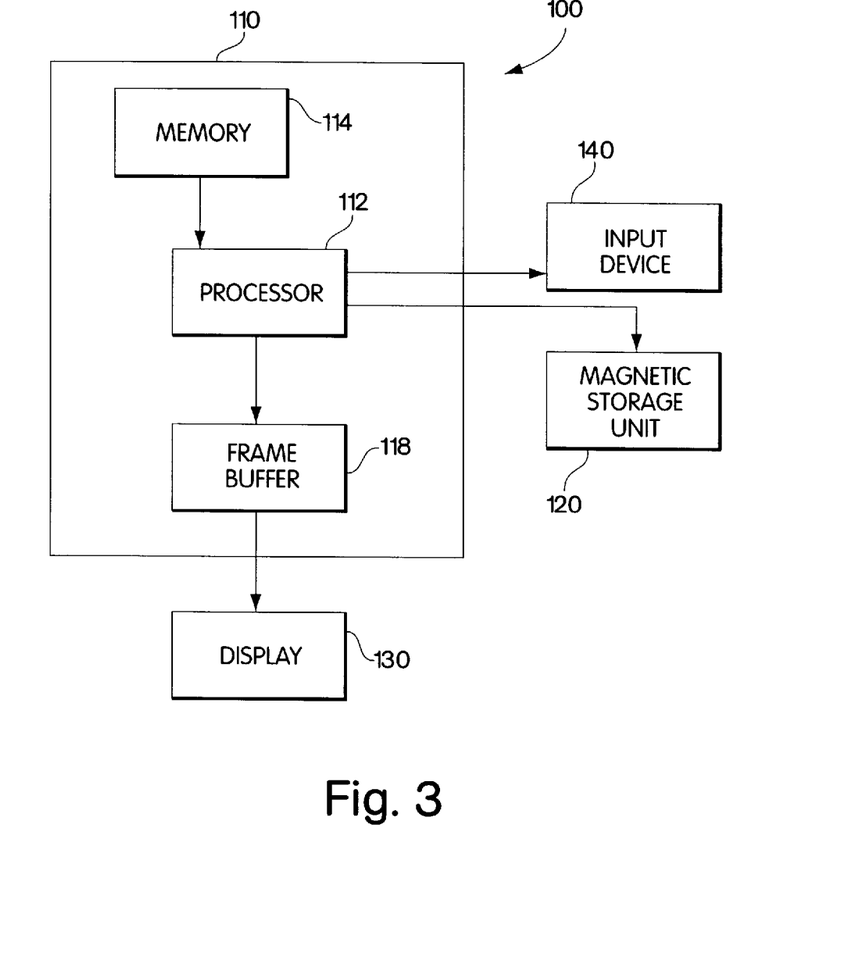
FIG. 3 is a block diagram of a computer system in accordance with one embodiment of the present invention.

FIG. 3 shows an example of a computer system 100 that provides image processing of two-dimensional spatial images in accordance with one embodiment of the present invention. The computer system 100 includes a central processing unit (CPU) 110, a magnetic storage unit 120, a display 130 for displaying original images of objects and transformed images of objects, and an input device 140. In a preferred embodiment of the present invention, the computer system 100 is implemented using an HP C110 manufactured by Hewlett Packard Company. The magnetic storage unit may be implemented using one or more hard disk drives and floppy disk drives, and the input device may be implemented using a standard keyboard along with one or more other input devices such as a mouse, a trackball, or a joystick.

As shown in FIG. 3, the CPU 110 includes a processor 112, memory 114, and a frame buffer 118 for storing an image to be displayed on the display 130. The processor 112 provides the primary processing capabilities of the computer system 100 and may be implemented using one of several processors, and in a preferred embodiment is implemented using a PCXT' processor manufactured by Hewlett Packard Company. The memory 114 is used for storage of program instructions and for temporary storage of results of calculations performed by the processor 112. The memory may be implemented using read only memory (ROM) and random accessible memory (RAM), and in a preferred embodiment, the memory includes 64 Mb of RAM. The frame buffer 118 is a buffer memory device capable of storing one frame of data for the display device 130. The software routines for performing image transformation in accordance with embodiments of the invention are preferably implemented using the "C" programming language and may reside in the memory 114 and/or magnetic storage unit 120. The computer program for performing image translation in accordance with embodiments of the invention may be stored on a computer-readable medium such as, for example, magnetic disk, compact disk, or magnetic tape and may be loaded into the computer system 100 using an appropriate peripheral device as known in the art.

The operation of the computer system 100 in accordance with a first embodiment of the present invention will now be described with reference to FIGS. 3 and 4. The computer system transforms a source image representative of an object into a destination image representative of the object, said source image comprising a source pixel array and said destination image comprising a destination pixel array. The processor 112, upon receipt of instructions from the input device 140 in step 200, generates a transformation matrix for transforming a source image into the transformed image in step 210. These processes are depicted as steps 200 and 210 in FIG. 4. In a preferred embodiment of the present invention, the transformation matrix is the 2D affine transformation matrix shown in equation (1), and each of the variables of the transformation matrix a, b, d, e, g, and h is represented as a 32 bit, fixed point format word using 16 bits to represent the scalar portion of the variable and 16 bits to represent the fractional portion of the variable. As described below in further detail, the representation of the variables of the transformation matrix in fixed point format allows, after an initial calculation, backward mapping of consecutive points within a row of the destination array to the source array using only simple integer addition, and no floating point multiplications or additions as in prior art devices.

The number of bits used to represent the scalar part of the transformation matrix variables and to represent the fractional portion of the transformation matrix variables is determined based on a desired resolution of the transformed image. Depending on the desired resolution, digital words other than 16 bits may be used for the scalar portion and the fractional portion of the variables. The number of bits used to represent the scalar portion does not have to equal the number of bits used to represent the fractional portion. With the use of 16 bits for the scalar portion and 16 bits for the fractional portion, the largest value that can be represented by the 32 bit fixed point word is 65,535.9999. The 16 bits of the fractional portion of the variables are used as an index into a precalculated lookup table that contains the fractional floating point value. The index is used when converting the variable from fixed point format to floating point format. The fractional floating point value is equal to the index value divided by 65,536. In a preferred embodiment, the 32 bit words used to represent fixed point values use 2's complement numeric coding.

Figure 4:
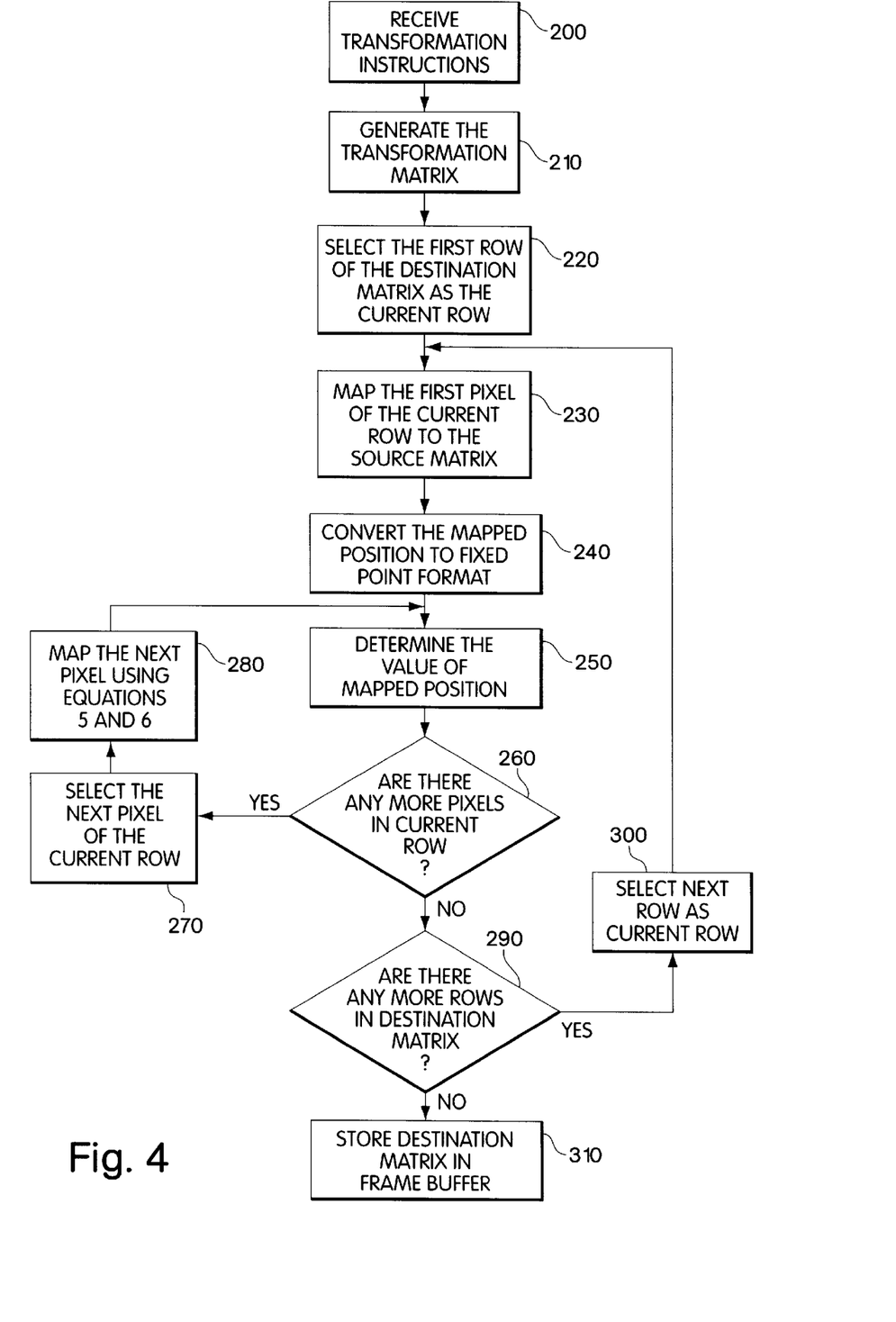
FIG. 4 is a flow chart showing the operation of a computer system to transform a spatial image of an object in accordance with a first embodiment of the present invention.

After the transformation matrix has been generated in fixed point format as described above, the operation of the computer system 100 proceeds to steps 220 and 230 of FIG. 4, wherein the first pixel, $p_{00}$, of the first row of the destination array, at location $x_{00}$, $y_{00}$, is mapped to the source array. Using equation (1), the mapped location ($x_{00}'$, $y_{00}'$) on the source array of pixel $p_{00}$ may be calculated. As discussed above, the values $x_{00}'$ and $y_{00}'$ are real values in floating point format. In step 240, the values $x_{00}'$ and $y_{00}'$ are converted to fixed point format using 16 bits for the scalar portion and 16 bits for the fractional portion. One of the three methods described above for determining the pixel value is then used to determine the value of the destination array pixel $p_{00}$ using the values $x_{00}'$ and $y_{00}'$ (step 250). Methods and apparatus for determining the value of the destination array pixel by bilinear and bicubic interpolation in the case of image magnification are disclosed in U.S. patent application Ser. No. 08/656,500 filed concurrently herewith (Attorney's Docket No. 10960546) and entitled "Interpolation Method and Apparatus For Fast Image Magnification" which is hereby incorporated by reference.

In step 260, a determination is made as to whether there are any more destination pixels in the current row of the destination array. If there are more pixels in the current row, then in step 270 the computer selects the next pixel (the pixel adjacent the one that has just been mapped). The pixel next to pixel $p_{00}$ of the destination array shown in FIG. 2 is $p_{10}$. Pixel $p_{10}$ is mapped on to the source pixel array in step 280 using equations (4) and (5).

$$x_{ij}' = x_{(i-1)j}' + a \qquad (4)$$

$$y_{ij}' = y_{(i-1)j}' + b \qquad (5)$$

wherein:

$x_{ij}'$=the mapped x value on the source array of pixel $p_{ij}$;
$y_{ij}'$=the mapped y value on the source array of pixel $p_{ij}$;
$x_{(i-1)j}'$=the mapped x value on the source array of pixel $p_{(i-1)j}$;
$y_{(i-1)j}'$=the mapped y value on the source array of pixel $p_{(i-1)j}$;
a and b are variables of the transformation matrix in fixed point format; and
i and j represent the column and row, respectively, of the pixel being mapped.

Using equations (4) and (5), pixel $p_{10}$ can be mapped using only the mapped position of pixel $p_{00}$ and variables a and b of the transformation matrix. Equations (4) and (5) are derived from equations (2) and (3). Each of the variables in equations (4) and (5) is in fixed point format. Accordingly, the processor 112 of the computer system can perform the calculations of equations (4) and (5) using only simple integer additions to determine the mapped points on the source array corresponding to pixel $p_{10}$ of the destination array. Steps 250 and 260 are repeated for pixel $p_{10}$, and then each of steps 250–280 are repeated for each pixel of the first row. After each of the pixels of the first row of the destination array has been mapped onto the source array, the result of decision block 260 will be "NO", and the operation of the computer system 100 proceeds with step 290.

In step 290, a determination is made as to whether there are any more rows of the destination array to be mapped to the source array. If the result of decision block 290 is "YES" then the computer selects the next row as the current row in step 300, and in step 230, maps the first pixel of the next row onto the source array using equation (1). In the pixel array shown in FIG. 1, the first pixel of the second row is the pixel $p_{01}$. The computer system 100 then proceeds to map each of the remaining pixels of the second row of the destination array to the source array using steps 250-280. The above procedure is repeated until all of the pixels of the destination array have been mapped to the source array. When all of the pixels of the destination array have been mapped to the source array, and the values of the destination pixels have been calculated using one of the three methods described above, then the computer system 100 stores the destination pixel array in the frame buffer 118 (step 310). In a preferred embodiment, the computer system stores pixel values of the destination pixel array in the frame buffer 118 as each one is determined rather than after all of the pixel values have been determined. This eliminates a step of transferring the destination array from the memory of the computer to the frame buffer and frees up memory in the computer for other uses.

In a second embodiment of the present invention, the operation of the computer described above with reference to FIGS. 2–4 is modified such that after an initial pixel of the destination array is mapped to the source array, the remaining pixels of the destination array can be mapped using only integer addition. In the second embodiment, the first pixel of each row except the first row is not calculated using equation (1) which requires floating point multiplication, but is calculated using the mapping results of the initial pixel of the previous row as shown in equations (6) and (7) below.

$$x_{ij}' = x_{i(j-1)}' + d \quad (6)$$

$$y_{ij}' = y_{i(j-1)}' + e \quad (7)$$

wherein:

$x_{ij}'$=the mapped x value on the source array of pixel $p_{ij}$;
$y_{ij}'$=the mapped y value on the source array of pixel $p_{ij}$;
$x_{i(j-1)}$=the mapped x value on the source array of pixel $p_{i(j-1)}$;
$y_{i(j-1)}$=the mapped y value on the source array of pixel $p_{i(j-1)}$;
d and e are variables of the transformation matrix in fixed point format.

Figure 5:
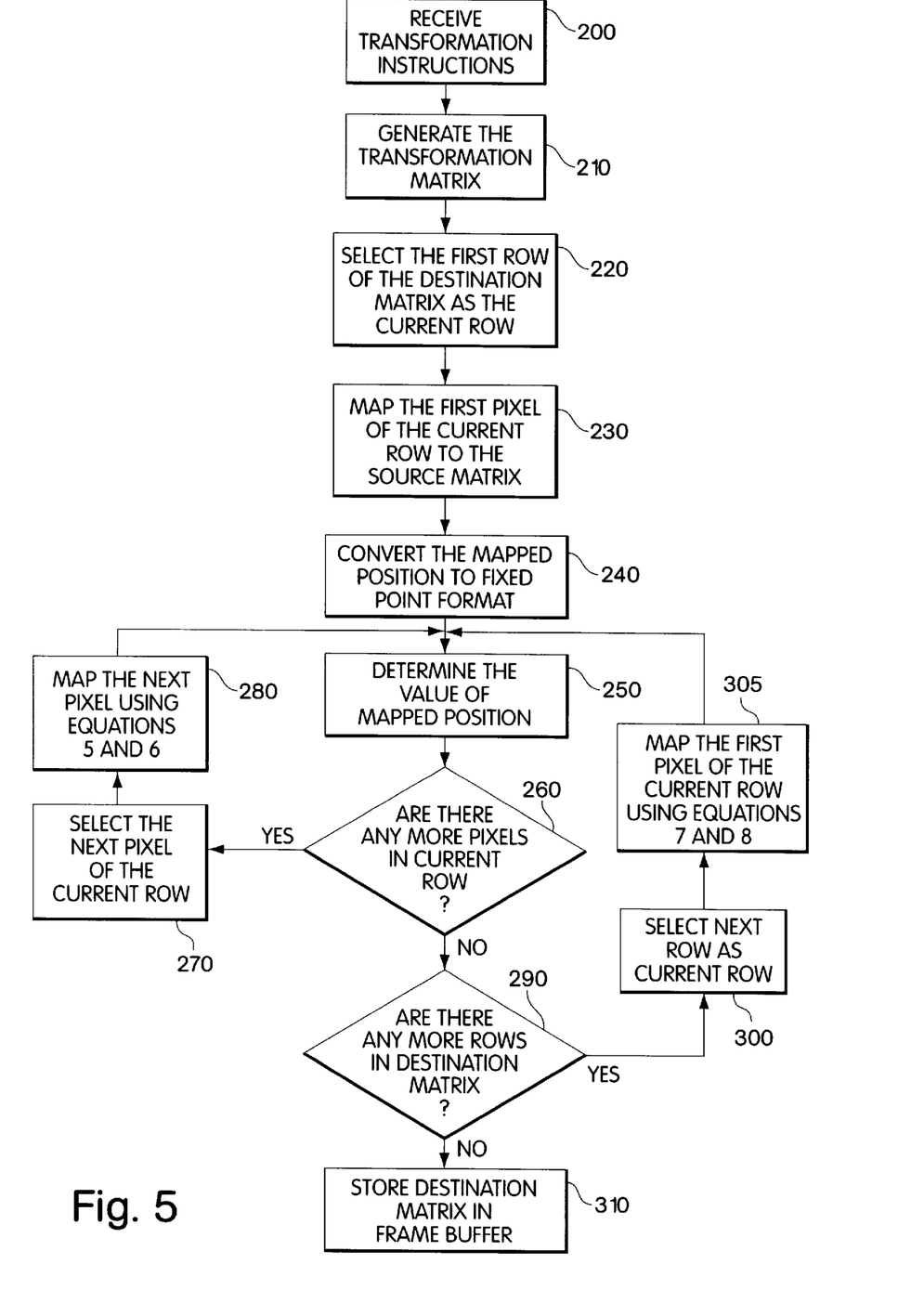
FIG. 5 is a flow chart showing the operation of a computer system to transform a spatial image of an object in accordance with a second embodiment of the present invention.

The operation of the computer system 100 in accordance with the second embodiment of the present invention is shown in FIG. 5. Steps 200–290 of the method shown in FIG. 5 are the same as steps 200–290 of FIG. 4. The operation shown in FIG. 5 includes an additional step 305 wherein the first pixel of the current row is mapped to the source array using equations (6) and (7).

In the second embodiment, the time required by the processor 112 to perform the mapping of the destination array to the source array is further reduced in comparison with the first embodiment as the number of floating point multiplications that must be performed is reduced even further. In the second embodiment, the accuracy of the image transformations may be somewhat less than in the first embodiment of the invention in which an initial pixel of each row is calculated in floating point format. This loss of accuracy occurs because of cumulative errors associated with stepping from one pixel to an adjacent pixel. The cumulative errors result from approximating the fractional portion of fixed point variables using an index value as discussed above.

The time required for transforming images of objects in embodiments of the present invention can be further reduced by performing the sampling step (step 250) simultaneously with the mapping of the next pixel. In bilinear and bicubic interpolation, floating point multiplication is used to determine destination pixel values. As discussed above, floating point multiplication is a time consuming process. However, the process of mapping a next pixel in the operation shown in FIG. 4 and FIG. 5 is independent of the sampling results of a previous pixel and therefore, may be performed in parallel with the sampling to further reduce the time required to transform images.

In embodiments of the present invention, the use of fixed point variables in the computer system 100 not only reduces the processing time required to determine the mapped position, but also reduces the processing time required to determine values of the pixels of the destination array. Nearest neighbor sampling requires the computer system to calculate the scalar portion of the mapped position. In prior art systems, this process requires a relatively large amount of time as the mapped position is in floating point format. In embodiments of the present invention, the mapped position is in fixed point format represented by a 32 bit word. The computer system 100 can determine the scalar portion of the 32 bit word by performing a simple 16 bit shift of the 16 most significant bits of the 32 bit word to the 16 least significant bits. After the shift, the 16 least significant bits of the mapped position represent the scalar portion. Thus, the time required to perform nearest neighbor sampling in embodiments of the present invention is less than the time required in prior art systems.

Bilinear and bicubic interpolation calculations use the fractional portion of the mapped position. In embodiments of the present invention, the fractional portion of the x value and the y value of the mapped position is represented by an index value using the 16 least significant bits of the fixed point word used to represent the mapped position. The fractional portion can be determined using a lookup table to convert the index value to the fractional value as previously discussed with respect to the transformation variables. This is a relatively simple procedure for the processor 112 and is less time consuming than the conversion of floating point variables to extract the fractional portion used in prior art systems.

Embodiments of the present invention significantly reduce the time required to transform images of objects over the time required in prior art systems. Time savings of 10% to almost 100% have been achieved in computer systems implementing embodiments of the present invention. The actual time required to transform images is dependent on many factors including the translation function to be performed and the characteristics of the computer system.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

I claim:

1. An image processing apparatus in a computer system for transforming a source image representative of an object into a destination image representative of the object, said source image comprising a source pixel array and said destination image comprising a destination pixel array, each of the source pixel array and the destination pixel array having a plurality of pixels, each of the plurality of pixels having an x value and a y value, the image processing apparatus comprising:

means for generating a transformation matrix having transformation variables represented in fixed point format;

means for mapping a first pixel of the destination pixel array onto the source pixel array by multiplying the x value and the y value of the first pixel by the transformation matrix to obtain a first mapped position on the source pixel array, the first mapped position having an x value and a y value; and means for mapping a second pixel of the destination array onto the source array by adding a first variable of the transformation matrix to the x value of the first mapped position and by adding a second variable of the transformation matrix to the y value of the first mapped position to obtain a second mapped position.

2. The image processing apparatus of claim 1, further comprising:

means for converting each of the x values and the y values of each mapped position on the source array to fixed point format represented by a plurality of bits.

3. The image processing apparatus of claim 2, wherein the plurality of bits used to represent each of the x values and the y values of mapped positions in fixed point format comprises:

a first group of bits to represent a scalar portion of each of the x values and the y values; and a second group of bits to represent a fractional portion of each of the x values and the y values.

4. The image processing apparatus of claim 3, wherein the second group of bits includes an index to represent the fractional portion, and wherein the image processing apparatus further comprises a lookup table for converting the index to a decimal value equal to the fractional portion.

5. The image processing apparatus of claim 4, wherein the first and second pixels of the destination pixel array are in a first row of the destination pixel array, and wherein the image processing apparatus further comprises:

means for mapping a first pixel of a second row of the destination pixel array onto the source pixel array by multiplying the x value and the y value of the first pixel of the second row by the transformation matrix to obtain a third mapped position on the source pixel array, the third mapped position having an x value and a y value; and means for mapping a second pixel of the second row of the destination array onto the source array by adding the first variable of the transformation matrix to the x value of the third mapped position and by adding the second variable of the transformation matrix to the y value of the third mapped position.

6. The image processing apparatus of claim 4, wherein the first and second pixels of the destination pixel array are in a first row of the destination pixel matrix, and wherein the image processing apparatus further comprises:

means for mapping a first pixel of a second row of the destination array onto the source array by adding a third variable of the transformation matrix to the x value of the first mapped position and by adding a fourth variable of the transformation matrix to the y value of the first mapped position to obtain a third mapped position on the source array, the third mapped position having an x value and a y value; and means for mapping a second pixel of the second row of the destination array on to the source array by adding the first variable of the transformation matrix to the x value of the third mapped position and by adding the second variable of the transformation matrix to the y value of the third mapped position.

7. The image processing apparatus of claim 3, further comprising:

means for determining a value of each one of the plurality of pixels of the destination pixel array based on a value of at least one of the pixels of the source pixel array and based on a corresponding mapped position of the one of the plurality of pixels of the destination pixel array.

8. The image processing apparatus of claim 7, wherein the first group of bits occupies the most significant bits of a digital word, the second group of bits occupies the least significant bits of the digital word, and the means for determining comprises:

means for shifting the first group of bits of the x value and the y value of the corresponding mapped position from the most significant bits to the least significant bits of the digital word to obtain the scalar portion of each of the x value and the y value of the mapped position.

9. The image processing apparatus of claim 1, wherein the first and second pixels of the destination pixel array are in a first row of the destination pixel array, and wherein the image processing apparatus further comprises:

means for mapping a first pixel of a second row of the destination pixel array onto the source pixel array by multiplying the x value and the y value of the first pixel of the second row by the transformation matrix to obtain a third mapped position on the source pixel array, the third mapped position having an x value and a y value; and means for mapping a second pixel of the second row of the destination array onto the source array by adding the first variable of the transformation matrix to the x value of the third mapped position and by adding the second variable of the transformation matrix to the y value of the third mapped position.

10. The image processing apparatus of claim 1, wherein the first and second pixels of the destination pixel array are in a first row of the destination pixel array, and wherein the image processing apparatus further comprises:

means for mapping a first pixel of a second row of the destination array onto the source array by adding a third variable of the transformation matrix to the x value of the first mapped position and by adding a fourth variable of the transformation matrix to the y value of the first mapped position to obtain a third mapped position on the source array, the third mapped position having an x value and a y value; and means for mapping a second pixel of the second row of the destination array onto the source array by adding the first variable of the transformation matrix to the x value of the third mapped position and by adding the second variable of the transformation matrix to the y value of the third mapped position.

11. The image processing apparatus of claim 1, further comprising:

means for determining a value of each one of the plurality of pixels of the destination pixel array based on a value of at least one of the pixels of the source pixel array and based on a corresponding mapped position of the one of the plurality of pixels of the destination pixel array.

12. The image processing apparatus of claim 1, further comprising a frame buffer that stores the destination pixel array.

13. A method for transforming a source image representative of an object into a destination image representative of the object, said source image comprising a source pixel array and said destination image comprising a destination pixel array, each of the plurality of pixels having an x value and a y value, the method comprising steps of:

generating a transformation matrix having transformation variables represented in fixed point format;

mapping a first pixel of the destination array onto the source array by multiplying the x value and the y value of the first pixel by the transformation matrix to obtain a first mapped position having an x value and a y value; and mapping a second pixel of the destination array onto the source array by adding a first variable of the transformation matrix to the x value of the first mapped position and by adding a second variable of the transformation matrix to the y value of the first mapped position to obtain a second mapped position.

14. The method of claim 13, wherein the step of mapping the first pixel comprises a step of:

converting the x value and the y value of the first mapped position to fixed point format represented by a plurality of bits.

15. The method of claim 14, wherein the step of converting comprises the steps of:

coding a scalar portion of the first mapped position using a first group of bits; and coding a fractional portion of the first mapped position using a second group of bits.

16. The method of claim 15, wherein the first and second pixels of the destination pixel array are in a first row of the destination pixel array, the method further comprising steps of:

mapping a first pixel of a second row of the destination pixel array to the source pixel array by multiplying the x value and the y value of the first pixel of the second row by the transformation matrix to obtain a third mapped position having an x value and a y value; and mapping a second pixel of the second row of the destination pixel array to the source pixel array by adding the first variable of the transformation matrix to the x value of the third mapped position and by adding the second variable of the transformation matrix to the y value of the third mapped position.

17. The method of claim 15, wherein the first and second pixels of the destination pixel array are in a first row of the destination pixel array, and wherein the method further comprises steps of:

mapping a first pixel of a second row of the destination image array onto the source image array by adding a third variable of the transformation matrix to the x value of the first mapped position and by adding a fourth variable of the transformation matrix to the y value of the first mapped position to obtain a third mapped position having an x value and a y value; and mapping a second pixel of the second row of the destination array on to the source array by adding the first variable of the transformation matrix to the x value of the third mapped position and by adding the second variable of the transformation matrix to the y value of the third mapped position.

18. The method of claim 15, further comprising a step of:

determining a value of each one of the pixels of the destination pixel array based on a value of at least one of the pixels of the source pixel array and based on a corresponding mapped position of the one of the pixels of the destination pixel array.

19. The method of claim 18, wherein the first group of bits occupies the most significant bits of a digital word, the second group of bits occupies the least significant bits of the digital word, and the step of determining comprises a step of:

shifting the first group of bits of the x value and the y value of the corresponding mapped position from the most significant bits to the least significant bits of the digital word to obtain the scalar portion of each of the x value and the y value of the corresponding mapped position.

20. The method of claim 18, further comprising a step of:

converting the index of the second group of bits into the fractional value by using a lookup table.

* * * * *